(No Model.)

F. E. STURDY.
CHAIN BAR.

No. 281,646. Patented July 17, 1883.

WITNESSES:
C. H. Leuthur Jr.
Wm. L. Cope

INVENTOR:
Frederick E. Sturdy
by Joseph A. Miller & Co.
Attys

UNITED STATES PATENT OFFICE.

FREDERICK E. STURDY, OF ATTLEBOROUGH, MASSACHUSETTS, ASSIGNOR TO J. F. STURDY & SONS, OF SAME PLACE.

CHAIN-BAR.

SPECIFICATION forming part of Letters Patent No. 281,646, dated July 17, 1883.

Application filed February 21, 1883. (No model.)

*To all whom it may concern:*

Be it known that I, FREDERICK E. STURDY, of Attleborough, in the county of Bristol and State of Massachusetts, have invented a new and useful Improvement in Chain-Bars; and I hereby declare the following to be a full, clear, and exact description of the same, reference being had to the accompanying drawings, forming part of this specification.

This invention has reference to an improvement in the chain-bars used on watch and other ornamental chains; and it consists in the peculiar and novel construction, in connection with an open-ended bar or tube, of utensils provided with suitable handles and made in part tubular, so that one of the utensils may be inserted into the other, as will be more fully set forth hereinafter.

Chain-bars have been heretofore constructed out of open-ended tubes, in which one or more utensils were placed; but the length of such utensils was limited to half or nearly half the length of the tubular portion of the bars, except in so far as projecting points extended over or beyond the meeting-point of the utensils, such as a tooth-pick extending beyond the thin portion of a pencil-case. These I do not claim as my invention, which consists in making one of the utensils tubular, so that the other may be entered into the first, and therefore may be of practically the length or nearly the length of the tubular portion of the chain-bar, and therefore a more useful device than the short devices heretofore used.

Figure 1:
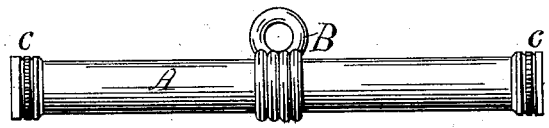
Figure 2:
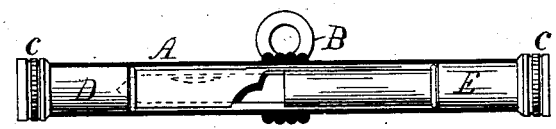
Figure 3:
Figure 4:
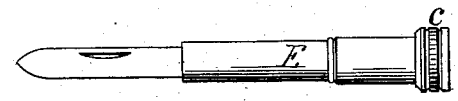
Figure 5:
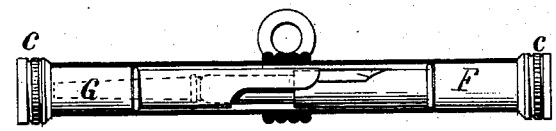
Figure 6:
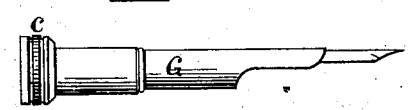
Figure 7:
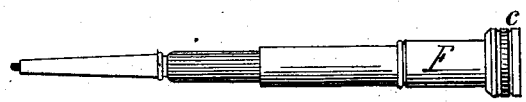

Figure 1 is a view of a chain-bar. Fig. 2 is a sectional view of the same, showing a tooth-pick and knife inserted in the bar. Fig. 3 is a view of the tooth-pick and holder. Fig. 4 is a view of the knife and handle. Fig. 5 is a sectional view of a chain-bar provided with a pen and a pencil. Fig. 6 is a view of the pen and holder, and Fig. 7 is a view of the pencil-case.

In the drawings, A is a tubular chain-bar. B is the central supporting-ring. C C are the ornamental ends of the bar, forming, also, the ends of the utensils inserted in the tubular portion A of the bar. D is a tooth-pick provided with a tubular handle, into which any other utensil may be inserted. E is a knife and handle. F is a pencil-case, and G is a pen-holder. The tooth-pick D and the pen-holder G are both tubular. The knife E and pencil-case F can therefore be made of nearly the length of the chain-bar and the ends inserted into the tubular utensils D and G, as is shown in Figs. 5 and 2. The base of the utensils is made to tightly fit the interior of the tubular bar A, and the ornamental ends C C form, when inserted, the ends of the chain-bar. The utensils are constructed to be used when removed from the bar, and by their increased length can be conveniently used in this way, making the improved chain-bar a more practical and useful device than those heretofore constructed.

Having thus described my invention, I claim as new and desire to secure by Letters Patent—

1. The combination, with the open-ended tubular bar A, provided with the ring B, of the utensils inserted into the tubular bar, each having the ornamental end C, which form the ends of the bar when inserted, one of the utensils being made tubular, so as to receive the end of the opposite utensil, as described.

2. A tubular chain-bar consisting of an open-ended tube in which two utensils are inserted, one of which is tubular the entire length, which is inserted in the bar, and the other constructed to enter the tubular opposite utensil, so that a utensil of practically the length of the chain-bar may be inserted with the other utensil, as described.

FREDERICK E. STURDY.

Witnesses:
J. A. MILLER, Jr.,
M. F. BLIGH.